United States Patent [19]

Vassiliou

[11] Patent Number: 5,100,273

[45] Date of Patent: Mar. 31, 1992

[54] EXPANSION FASTENING SYSTEM WITH QUICK LOCK AND RELEASE

[76] Inventor: Eustathios Vassiliou, 12 S. Townview La., Newark, Del. 19711

[21] Appl. No.: 725,408

[22] Filed: Jul. 2, 1991

Related U.S. Application Data

[63] Continuation of Ser. No. 578,074, Sep. 6, 1990, abandoned, which is a continuation-in-part of Ser. No. 479,104, Feb. 13, 1990, abandoned.

[51] Int. Cl.⁵ .............................................. F16B 13/06
[52] U.S. Cl. ............................................ 411/60; 411/30; 411/45; 411/448
[58] Field of Search ............... 411/29, 30, 45-48, 411/57, 60, 61, 446-448

[56] References Cited

U.S. PATENT DOCUMENTS

| | | |
|---|---|---|
| 1,295,734 | 11/1917 | Greubel . |
| 1,601,796 | 8/1923 | Gordon . |
| 1,648,855 | 11/1927 | Lytton ............................ 411/446 |
| 1,721,087 | 7/1929 | Pleister et al. . |
| 2,620,537 | 12/1952 | Gobin-Daude ................ 411/61 X |
| 2,720,135 | 10/1955 | Gisondi ......................... 85/2.4 |
| 2,823,572 | 2/1958 | Gisondi ......................... 411/61 |
| 3,112,547 | 11/1960 | Poe ................................ 24/211 |
| 3,147,525 | 10/1962 | Texier ........................... 24/73 |
| 3,148,579 | 9/1964 | Giovanetti ..................... 411/60 X |
| 3,357,749 | 4/1968 | Coldren et al. ................ 85/80 |
| 3,413,887 | 12/1968 | Von Wolff et al. ............ 411/60 X |
| 3,437,004 | 4/1969 | Pacharis ........................ 411/29 |
| 3,550,499 | 12/1970 | Ellenberger ................... 411/61 |
| 3,832,931 | 9/1974 | Talan ............................. 411/60 X |
| 4,142,440 | 3/1979 | Schefer ......................... 411/57 X |
| 4,331,413 | 5/1982 | Hoen ............................ 411/44 |
| 4,391,559 | 7/1983 | Mizusawa ..................... 411/45 |
| 4,403,377 | 9/1983 | Mizusawa ..................... 24/217 |
| 4,426,181 | 1/1984 | Omata .......................... 411/32 |
| 4,500,238 | 2/1985 | Vassiliou ....................... 411/30 |
| 4,637,765 | 1/1987 | Omata .......................... 411/45 X |
| 4,647,262 | 3/1987 | Yokota . |
| 4,708,552 | 11/1987 | Bustos et al. ................. 411/60 |
| 4,757,664 | 7/1988 | Freissle ......................... 52/509 |
| 4,765,788 | 8/1988 | Nowak et al. ................. 411/61 |
| 4,786,225 | 11/1988 | Poe et al. ...................... 411/32 |
| 4,828,439 | 5/1989 | Giannuzzi ..................... 411/37 |
| 4,832,547 | 5/1989 | Shinaishi ....................... 411/42 |
| 4,871,289 | 10/1989 | Choniere ...................... 411/48 |
| 4,874,276 | 10/1989 | Iguchi ........................... 411/48 |
| 4,874,277 | 10/1989 | Nowak et al. ................. 411/61 |

FOREIGN PATENT DOCUMENTS

| | | |
|---|---|---|
| 0053467 | 6/1982 | European Pat. Off. . |
| 0108334 | 5/1984 | European Pat. Off. . |
| 1916364 | 10/1970 | Fed. Rep. of Germany ........ 411/29 |
| 1217700 | 12/1959 | France . |
| 1323285 | 2/1963 | France . |

*Primary Examiner*—Renee S. Luebke
*Assistant Examiner*—Suzanne L. Dino
*Attorney, Agent, or Firm*—E. Vassiliou

[57] ABSTRACT

A vibration-resistant two-member fastening device characterized by quick lock and release. The first of the two members has an engagement edge which is adaptable to apply pressure on the second member. The second member has either a recessed surface or a threadline, the diameter of which decreases from a front point away from the head towards a back point close to the head.

25 Claims, 10 Drawing Sheets

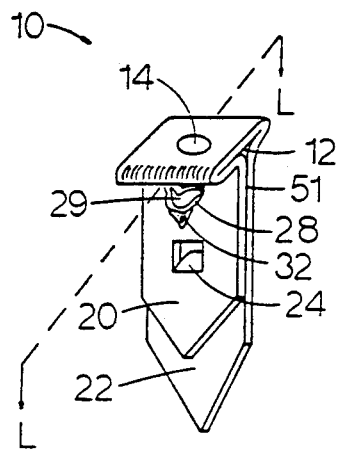
FIG. 1
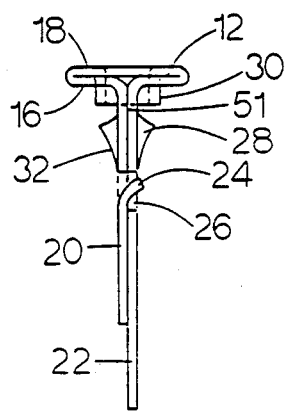
FIG. 2a
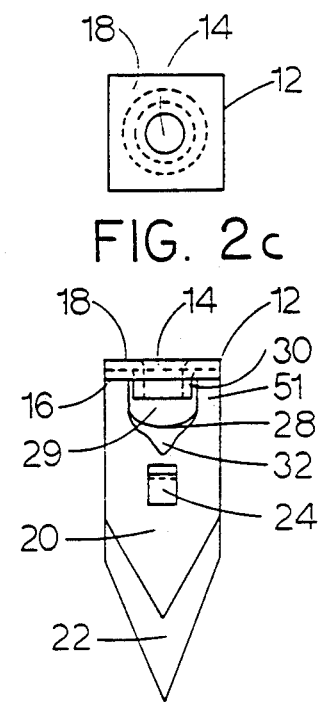
FIG. 2c
FIG. 2b
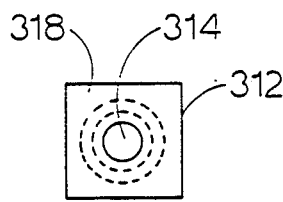
FIG. 3c
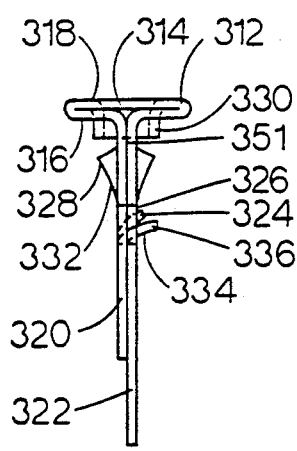
FIG. 3a
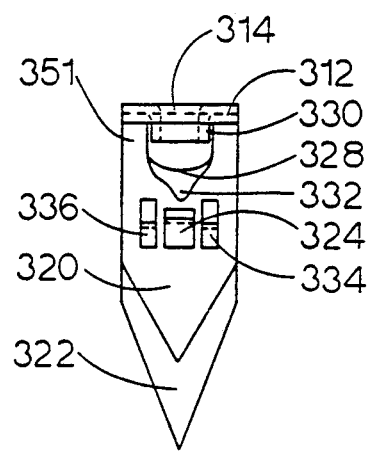
FIG. 3b
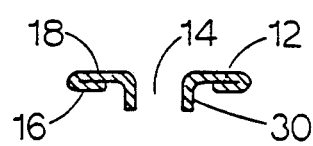
FIG. 4

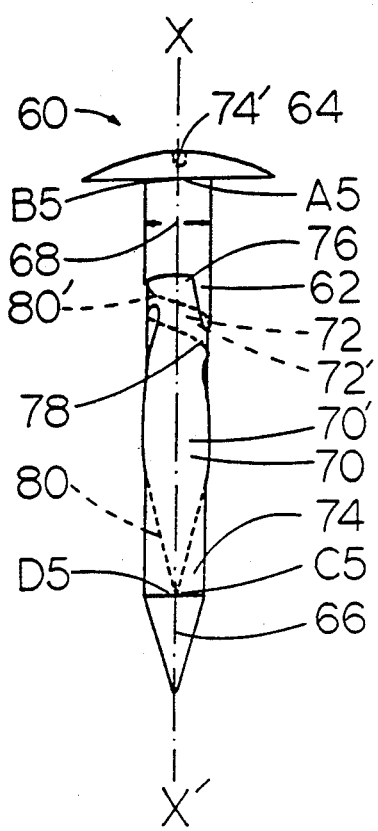
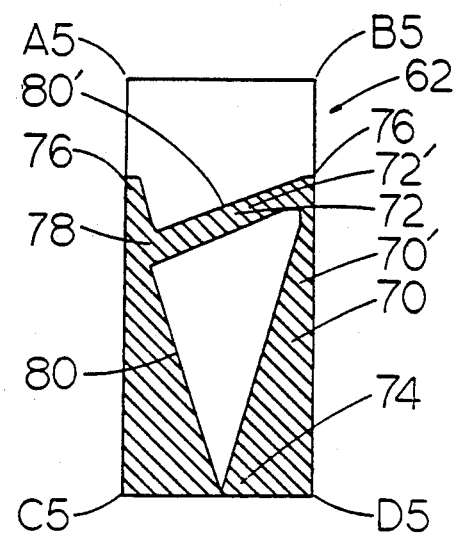
FIG. 5a
FIG. 5b
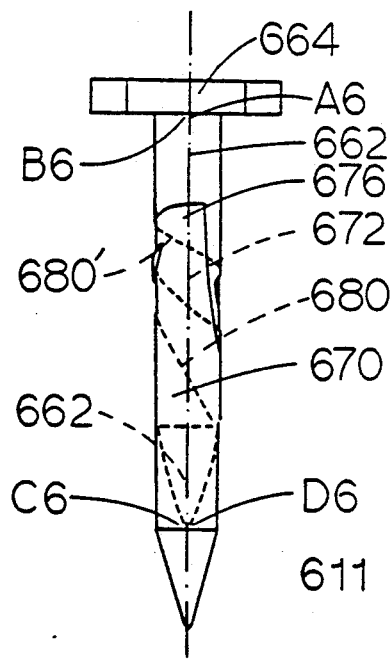
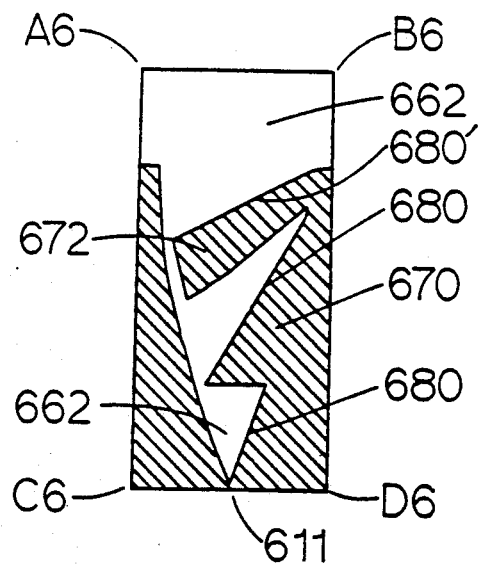
FIG. 6a
FIG. 6b

EXPANSION FASTENING SYSTEM WITH QUICK LOCK AND RELEASE

This is a Continuation of application Ser. No. 07/578,074, filed on 09/06/90, which is a Continuation-in-part of application Ser. No. 07/479,104, filed on 02/13/90, both now abandoned.

FIELD OF THE INVENTION

This invention relates to expansion fasteners, and more particularly to those fasteners characterized by quick lock and release mechanisms, as well as high resistance to the effects of vibration.

BACKGROUND OF THE INVENTION

A number of fasteners have been used in the past for securing one object on another object, as for example, securing an article on a hollow wall and disclosed in the patent art by U.S. Pat. Nos. 1,295,734, 4,500,238, 4,765,788, and 4,828,439 among others. All these patents describe two member fastening systems, where a first member is inserted in one object, while the second member is inserted first through the second object, and then into the second member, causing part of the second member to expand and thus secure the objects with respect to each other.

Since the second member, as aforementioned, supports one of the objects onto the first member, a substantial amount of force is usually exerted on said second member tending to separate the the second member from the first member, and therefore, dissolve the system. Thus, good binding between the two members is necessary, and it is usually achieved by utilizing threaded configurations, unless the friction between the first member and the second member is extraordinarily high for some reason. Such configurations may involve a female threaded portion on the first member, and a screw to be employed as a second member Despite the use of threaded configurations, however, even the screw arrangements are many times inadequate, especially in environments subjected to any type of vibration. It is very well known that vibrations cause screws to become loose, and miscellaneous mechanisms, most of which are based in increase of the friction force between the first and the second member, have been utilized in the past in attempts to prevent this from occurring. However, regardless of the relative success of these methods, the fastening system becomes more cumbersome, more difficult and more time consuming to use.

The substantial force exerted on the second member may be reduced considerably by inserting the first member through the two objects, and then inserting the second member in the first member to cause expansion and final fastening. In such occasions the force is mainly applied on parts of the first member, while the function of the second member is to maintain the first member in the expanded form. Thus, no substantial force tending to separate the two members is present. However, vibration again may cause the two members to separate, and dissolve the fastening function.

A large number of attempts have been made and tested in the past with rather limited success. When one problem is resolved, a different one arises, minimizing the final net effect.

The following U.S. patents, among many other ones, represent examples of attempts to resolve this vexing problem:

U.S. Pat. Nos. 1,601,796, 1,721,087, 3,112,547, 3,147,525, 3,357,749, 4,403,337, 4,331,413, 4,426,181, 4,647,626, 4,757,664, 4,708,552, 4,786,225, 4,832,547, 4,871,289, and 4,874,276.

Thus, it is an object of the instant invention to provide a fastening system lacking one or more of the disadvantages of the currently existing or proposed fasteners. More particularly, the different embodiments of this invention, may provide for example fastening systems which can be installed and/or disassembled easily and fast, and/or possess superior vibration proof properties, among other improvements.

SUMMARY OF THE INVENTION

The instant invention is directed to expansion fasteners characterized by resistance to the effects of vibrations, as well as by quick lock and release. In summary, the fasteners of this invention comprise a first fastening member, and a second fastening member. The first fastening member is adapted to secure a first object to a second object, by for example passing the first fastening member through both objects and then inserting an elongated second fastening member to the first fastening member through an aperture on the first member. The first fastening member has an expanding body, which expands by this insertion of the second fastening member, and causes securement of the first object onto the second object. The expanding body has an engagement edge, which coacts with the second fastening member. When the fastener is in use, the engagement edge of the first fastening member is at a back point of the second fastening member which is closer to the center axis of the second fastening member than adjacent points. This makes the back point a low energy position and prevents the second fastening member from accidental extraction, such as due to vibrations and the like. The back point may be at the bottom of recessed surfaces or in the form of threads having reduced diameter as it will be explained in detail later.

The elongated body of the second fastening member may have recessed or elevated surfaces or both with which the engagement edge may coact and apply pressure on, which preferably has a direction normal to the center axis of the elongated body, in order to bring about the advantages of the present invention. These surfaces may have a "particular appearance" or they may have a "multithread appearance", or a combination thereof, among many other attributes.

For purposes of better clarity and simplicity, the case of the fasteners of this invention having elongated bodies with "particular appearance" is treated separately from the case of fasteners of this invention having "multithread appearance", since the former are inherently more difficult to comprehend. Where no good distinction may be made on the type of the fastener, or when it has elements of both categories, the fastener is classified by the applicant as best fit. It should be understood, however, that this type of treatment is arbitrary and should not be construed as limiting the scope of the present invention.

More specifically, in the case of fasteners having "particular appearance", the fastening device comprises in combination an assembly of a first fastening member and a second fastening member, the first fastening member being adapted to secure a first object to a second object when the second fastening member is inserted into the first fastening member;
the first fastening member comprising
  a first head having an aperture; and
  an expanding body having an engagement edge, the expanding body being connected to and extending away from the head;
the second fastening member comprising an elongated body having
  an exterior portion,
  a back end constituting a second head, the second head having such shape as to render the second fastening member turnable within the first fastening member,
  a pointed front end opposite to the back end,
  a diameter commensurate to the aperture of the first head of the first member, and
  a center axis,
  the exterior portion having
    an optional leading recessed engaging surface having a continuity from a front point located towards the pointed front end to a back point located towards the second head, and
    a retracting recessed engaging surface also having a continuity from a front point located towards the pointed front end to a back point located towards the second head,
    the leading surface and the retracting surface having a common back point, with the option that the leading surface and the retracting surface may be one and the same engaging surface,
    each recessed surface also having
      a bottom throughout said recessed surface, the bottom being closer to the center axis at the back point than at any other point adjacent to the back point, excluding points behind the back point, and
      an active wall adaptable to coact with and be guided by the first engaging edge, the active wall having a tangent, the projection of the tangent on a plane containing the center axis and being parallel to the tangent forming an angle with the center axis smaller than 90 degrees;
the first engaging edge of the first fastening member being adaptable to apply pressure to any point of the bottom of the recessed area that the first engaging edge is in contact with, and the distance of which from the center axis is equal or greater than that of the distance of the back point from said back axis; and
the first engaging edge of the first fastening member and the back point being equidistant from the first head when the second fastening member is driven entirely through the aperture of the first fastening member.

On the other hand, in the case the case of fasteners with "multithread appearance", the fastening device comprises in combination an assembly of a first fastening member and a second fastening member, the first fastening member being adapted to secure a first object to a second object when the second fastening member is inserted into the first member;
the first fastening member comprising
  a first head having an aperture; and
  an expanding body having an engagement edge, the expanding body being connected to and extending away from the head;
the second member comprising an elongated body having
  a second head at one end, the second head having a shape adaptable to be turned by a driving tool;
  a leading point at the opposite end;
  a diameter commensurate to the aperture of the first fastening member; and
  threadline along at least part of the elongated body, with the requirement that the engagement edge is in yielding cooperation with and applies pressure on the threadline at an engagement position when the second member is completely inserted in the first member, so that
    the second member may be inserted completely in the first member without the second member turning when an adequate direct insertion force is applied on the second member through the aperture, and
    when the second head is turned by the driving tool in a preselected direction, after the second member has been completely inserted in the first member, the second head is forced to be at least partially advanced away from the first head,
the diameter of the threadline becoming smaller at the engagement position as compared to the diameter of the threadline in front of it toward the leading point.

Of high importance is also a fastening member comprising an elongated body having
  a head at one end, the head having a shape adaptable to be turned by a driving tool;
  a leading point at the opposite end; and
  threadline with thread turns, between the leading point and the head, along at least part of the elongated body, with the requirement that the diameter of the threadline decreases at least along part of the threadline in a direction from the leading point toward the head.

DESCRIPTION OF THE DRAWING

The reader's understanding of practical implementation of preferred embodiments of the invention will be enhanced by reference to the following detailed description taken in conjunction with perusal of the drawing figures, wherein:

FIG. 1 is a schematic diagram showing a perspective view of the first fastening member according to a preferred embodiment of this invention.

FIG. 2(a) shows the side view of the fastening member illustrated in FIG. 1.

FIG. 2(b) shows the front view of the fastening member illustrated in FIG. 1.

FIG. 2(c) shows the top view of the first head belonging to the fastening member illustrated in FIG. 1.

FIG. 3(a) shows the side view of the first fastening member of a different embodiment of the instant invention, where a guide is present on the sides of the engaging edge of the first fastening member.

FIG. 3(b) shows the front view of the first fastening member of a different embodiment of the instant invention, where a guide is present on the sides of the engaging edge of the first fastening member.

FIG. 3(c) shows the top view of the first fastening member of a different embodiment of the instant invention, where a guide is present on the sides of the engaging edge of the first fastening member.

FIG. 4 is a cross section of the first head of the first fastening member shown in FIG. 1 at line LL.

FIG. 5(a) is a schematic diagram showing the front view of the second fastening member of a preferred embodiment of the present invention.

FIG. 5(b) is a schematic diagram showing a view of the surface of the main body of the second fastening member of FIG. 5(a) if said surface were unfolded from a line coinciding with the intersection of the surface and a plane passing through the center axis and being perpendicular to the plane of the paper.

FIG. 6(a) is a schematic diagram showing the front view of the second fastening member of another embodiment of the present invention.

FIG. 6(b) is a schematic diagram showing a view of the surface of the main body of the second fastening member of FIG. 6(a) if said surface were unfolded from a line coinciding with the intersection of the surface and a plane passing through the center axis and being perpendicular to the plane of the paper.

DETAILED DESCRIPTION OF THE INVENTION

Figure 7A:
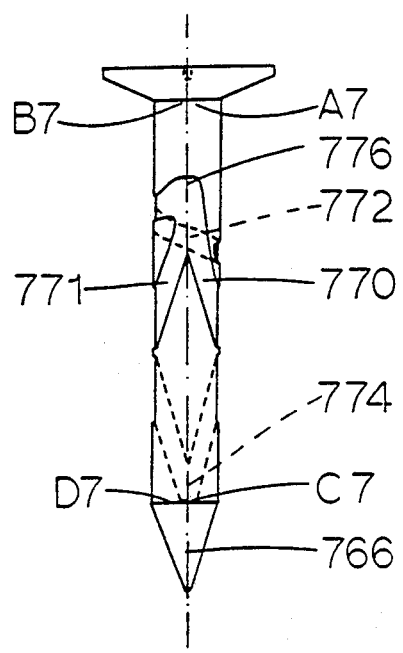
FIG. 7(a) is a schematic diagram showing the front view of the second fastening member of another embodiment of the present invention.

The instant invention is directed to expansion fasteners or fastening devices characterized by resistance to the effects of vibration, as well as by quick lock and release. The fasteners of this invention comprise a first fastening member, and a second fastening member. The first fastening member is adapted to secure a first object to a second object, by for example passing the first fastening member through both objects and then inserting an elongated second fastening member to the first fastening member through an aperture on the first member. The first fastening member has an expanding body, which expands by this insertion of the second fastening member, and causes securement of the first object onto the second object. The expanding body has an engagement edge, which coacts with the second fastening member. The elongated body of the second fastening member may have recessed or elevated surfaces or both with which the engagement edge may coact and apply pressure on, preferably normal to the center axis of the elongated member, in order to bring about the advantages of the present invention. These surfaces may have a "particular appearance" or they may have a "multithread appearance", or a combination thereof, among many other attributes.

For purposes of better clarity and simplicity, the case of the fasteners of this invention having elongated bodies with "particular appearance" is treated separately from the case of fasteners of this invention having "multithread appearance", since the former are inherently more difficult to comprehend. Where no good distinction may be made on the type of the fastener, or when it has elements of both categories, the fastener is classified by the applicant as best fit. It should be understood, however, that this type of treatment is arbitrary and should not be construed as limiting the scope of the present invention.

FIGS. 1 to 21 may be utilized to illustrate examples employing fasteners having an elongated body of "particular appearance". On the other hand, FIGS. 1 to 4, 15 to 20, and 22 to 30 may be utilized to illustrate examples employing fasteners having an elongated body of "multithread appearance". However, as aforementioned, this distinction is done for clarity purposes only and does not exclude any combinations of elements or functions of the devices of the two categories.

Fasteners with Elongated Bodies of "Particular Appearance"

In a preferred embodiment of this invention, the first fastening member 10 is illustrated in FIGS. 1, 2, and 4. It is similar to the anchors described in U.S. Pat. Nos. 4,500,238, 4,765,788, 4,874,277, and 4,941,340, all four of which are herein incorporated by reference. The first fastening member according to the instant invention may preferably be made of thin sheet metal, preferably spring steel, by stamping, folding and most frequently heat treating. However, this invention includes any other shape of cross sectional configuration, such as round, square, rectangle, polygonal, random, and the like, as long as the requirements set forth herein are met. Also, materials other than metal, such as plastics or other structural materials, including naturally occurring materials may be also used, as long as they conform to the requirements imposed by the instant invention. In case plastic materials are used, injection molding is the preferred way of manufacturing member 10.

The first fastening member 10 comprises a first head 12. A cross section of head 12 at line LL of FIG. 1 is shown in FIG. 4. Head 12 has an aperture 14, an inside surface 16, and an outside surface 18. The aperture 14 extends throughout the first head 12. Member 10 also has a neck 51 connected to the inside surface of the head 12 at one end and flexibly to a pair of expanding bodies 20 and 22, at the other end. The expanding bodies 20 and 22 extend in a direction generally perpendicular to a plane containing the inside surface 16 of the first head 12. The expanding bodies 20 and 22 are disposed generally in transverse relation with respect to each other, in a way that they are forced to open upon insertion of the second fastening member 60 into the first fastening member 10 through the aperture 14 from the first surface 18, as better illustrated in FIG. 12. The length of the neck 51 depends on the nature and dimensions of the objects to be secured, and it is subject of the particular design. The expanding bodies 20, and 22, as well as the neck 51 may have reinforcing configurations, such as angled, grooved, or bent portions, as well as barbs, preferably along their edges for better anchorage on the objects to connect and secure on each other. The neck 51 has an opening 29 extending from one end to the other end of the neck, the opening being substantially concentric with the aperture 14 of the first head 12.

Expanding body 20 has an engaging edge 24, as illustrated in FIGS. 2, and 3. As shown in FIGS. 1 and 2, according to a preferred embodiment of the instant invention, engaging edge 24 is a partially cut-off and bent, preferably obliquely, section of expanding body 20 extending through a respective opening on expanding body 22. The oblique angle of the engaging edge is preferable in the case of using a distinct leading recessed engaging surface, for improving the guiding characteristics of the engaging edge during insertion of the second fastening member 60 into the first fastening member 10, and also to facilitate removal of the second fastening member. Engaging edge 24, in addition to its function to coact with parts of the second expanding body 60, as described hereinafter, its walls may also be in temporary frictional engagement with the walls of opening 26, so that if a heat treatment and quenching is necessary to harden the first fastening member, after it has been stamped and folded, the frictional force between said walls is high enough to hold the two expanding bodies together during quenching, but also it is low enough to be overcome and allow the two expanding bodies to be separated and open upon insertion of the second member 60 into the first member 10.

In case the cross section is larger than that already described, such as round for example, expanding body 22 may have a cavity in place of opening 26 to nest engaging edge 24. In addition, the engaging edge 24 may be a protrusion instead of a partially cut-off and bent portion of expanding body 20. Also, in the case of softer materials, such as plastics, a harder material, such as metal, ceramic, glass, and the like may be attached to expanding body 22 in order to serve as the engaging edge 24, or part of it. It should be understood, however, that in the case of any material of construction the engaging edge may be a different attached material.

The first fastening member 10 has also an entry 28 serving to funnel the first fastening member 60 within the first 20 and the second 22 expanding bodies. This entry 28 may be in the form of outwardly directed protrusions on the expanding bodies, when the expanding bodies are in the form of thin sheet metal, or it may be in the form of cavities of diminishing diameter or missing altogether, when the cross section of the expanding bodies is bulkier, as the case is usually with plastic anchor configurations.

An important element of the first fastening member is a guide which is disposed on the side of the inside surface 16, and which serves to direct the second fastening member 60 (FIG. 5) in a straight direction within the first fastening member 10. This guide may be the continuation of the walls 30 of the aperture 14. It may also be the continuation 32 of entry 28 or a combination thereof.

As shown in another embodiment of this invention, illustrated in FIG. 3, the guide may also be in the form of two cut-off and bent sections 334 and 336 of expanding body 320 extending through a respective opening on expanding body 322, on either side of engaging edge 324, which also is a partially cut-off and bent section of expanding body 320 extending through a respective opening on expanding body 322. In all other respects the first fastening member of the embodiment illustrated in FIG. 3 is identical to the embodiment shown in FIGS. 1, 2, and 4.

The second fastening member 60 of a preferred embodiment of the instant invention is shown in FIG. 5 (a) and (b). Referring to FIG. 5(a), it comprises an elongated body having an exterior portion 62, a back end constituting a second head 64, and a pointed front end 66 opposite to the back end or head 64. Its diameter 68 is commensurate to the aperture 14 of the first head 12 of the first member 10. The second head 64 has preferably such shape as to be turnable when it is within the first member 10. It may be either manually turnable by having a large enough exposed area, such as a butterfly shaped portion (not shown), or preferably it may be turnable through a small slot 74' by a driving tool, such as a screw driver. Of course, instead of a screw driver, an alen wrench or other type of wrench may be used, in which case the slot is replaced by a suitable cavity, or other structurally engageable configuration corresponding to the desirable driving tool. In some limited occasions, however, it may be desirable to have the second head 64 non-turnable, manually or by tool means. In such occasions the shape of head 64 should be lacking engageable configurations.

The second fastening member 60 also has a center axis X—X', which would be an axis of symmetry, absent the recessed engaging surfaces, which are defined hereinafter.

The exterior portion 62 has a leading recessed engaging surface 70, and a retracting recessed engaging surface 72. The leading recessed surface 70 has a continuity, or in other words a continuous path, from a front point 74, located towards the pointed front end 66 to a back point 76, located towards the second head 64 of the second fastening member 60. The word "point" here (for both front and back points) is used liberally to denote a general area rather than strictly a single spot of infinitesimal dimensions. The retracting recessed engaging surface also has a continuity from a front point 78 located towards the pointed front end 66 to a back point 76 located towards the second head 64, the back point 76 being a common back point for both the leading 70 and the retracting 72 recessed engaging surfaces.

As it will be seen in the embodiment of FIG. 10, discussed in more detail later, the two recessed engaging surfaces may constitute one and the same recessed surface. In addition, it is worth noting, that for the purposes of this invention any retracting recessed engaging surface may also be considered as a leading recessed engaging surface, whether in a particular application is used as such or not.

Recessed areas 70 and 72, each have a bottom 70' and 72', respectively. An important characteristic of the bottom in either case, is that the part of the bottom at the common back point 76 is deeper, or in other words closer to the center axis, than at any other point adjacent to the back point, excluding points behind the back point 76, or differently stated points between the back point 76 and the head 64 of the second fastening member 60. The reasons why will be completely clarified when the operation of the fastening device is described. It is preferable that the bottom 70' and 72' of the recessed engaging surfaces gradually advance closer to the center axis in a direction from a point between the front point 74 for bottom 70' and 78 for bottom 72' towards the common back point 76.

Recessed areas 70 and 72, each also have an active wall 80 and 80', respectively. The active wall is adaptable to coact with and be guided by the first engaging edge 24 when the second member 60 is inserted into the first member 10. The active wall has also a tangent (not shown) giving the local direction of the wall at any point of the wall. The projection of this tangent on a plane containing the center axis and being parallel to the tangent, should form an angle with the center axis smaller than 90 degrees. The expression "adaptable to coact with and be guided by" means that under certain conditions, when the engaging edge comes in contact with an active wall it may coact and lead the wall in a way to rotate the second fastening member within the first fastening member, or displace the second member inwardly or outwardly with respect to the first member; however, it will not necessarily do so. For example, in some circumstances the engaging edge 24 may jump over an active wall, especially if the engaging edge and the wall under consideration have been designed to coact in this manner. Walls opposite to active walls may have gradual instead of precipitous configuration so that the engaging edge 24 may climb over them more easily, when it is forced to do so, as for example during removal of the second fastening member from the first fastening member. In addition to this a lubricant or a release coating may be used on one or both first and second fastening members to facilitate the inserting and the removal operations.

FIG. 5(b) shows in more detail the exterior portion 62 with its recessed surfaces being shaded. It represents an imaginary unfolded view of the exterior portion. If one could cut to a small depth and unfold the exterior portion between points A5, B5, and C5, D5, one would come up with the configuration shown in FIG. 5(b). The same is true in the case of the embodiments shown in FIGS. 6, 7, 8, 9, and 10, where part (b), of each figure represents an unfolded view of the respective exterior portion.

Figure 12:
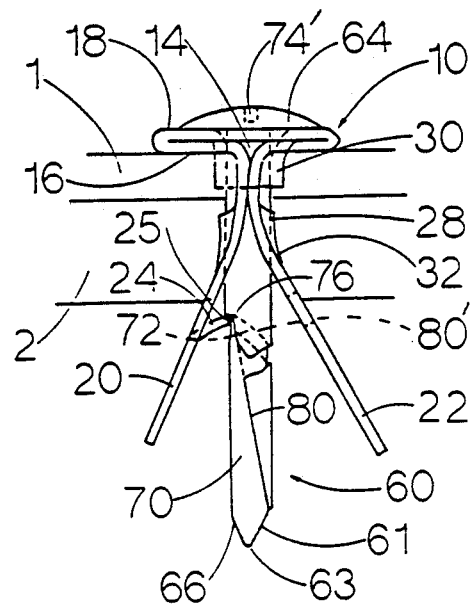
FIG. 12 is a schematic diagram of the second fastening member completely inserted in the first fastening member with the engaging edge of the first fastening member engaged at the back point of the recessed engaging surface of the second fastening member; it also shows a first object secured on a second object by the fastening device.
Figure 13:
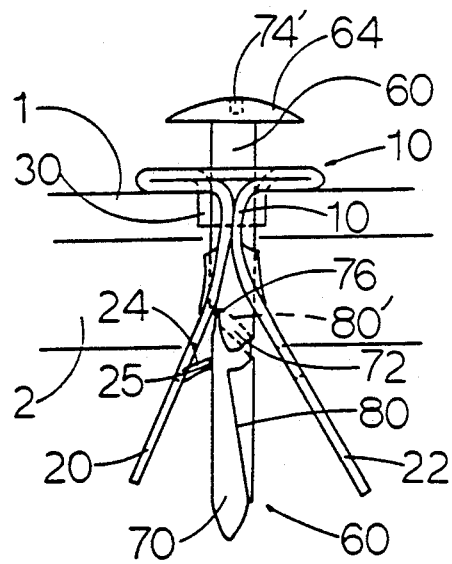
FIG. 13 illustrates the same arrangement shown in FIG. 12, after the second fastening member has been turned counterclockwise by approximately 360 degrees.
Figure 14:
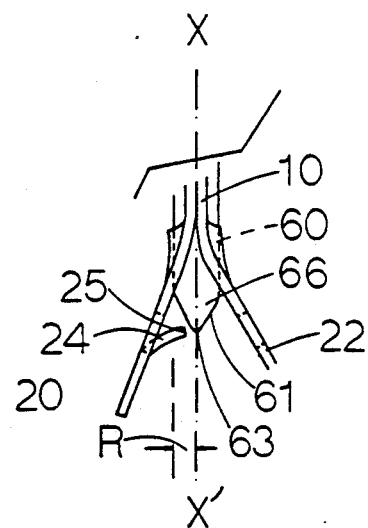
FIG. 14 is a schematic diagram showing a desirable relative entering position of the pointed front end of the second fastening member with respect to the engaging edge of the first fastening member.

Referring briefly to FIGS. 12, 13, and 14, it is very important for the practice of this invention that the first engaging edge 24 of the first fastening member 10 is adaptable to apply continuously pressure to any point of the bottom 70 and 70' of the recessed areas 70 and 72, respectively, that it is in contact with, and the distance of which from the center axis X—X' is greater than that of the distance of the back point 76 from said back axis X—X'.

It is also important that the first engaging edge 24 of the first fastening member 10, and the back point 76 of the second fastening member 60 are equidistant from the first head 12, when the second fastening member 60 is driven entirely through the aperture 14 of the first fastening member 10.

An additional important parameter is that the first fastening member 10 itself be adaptable to secure the first object 1 to the second object 2 upon connecting the two objects with the first fastening member 10 and inserting the second fastening member 60 into the first fastening member 10 causing opening of the expanding bodies 20 an 22.

Figure 15:
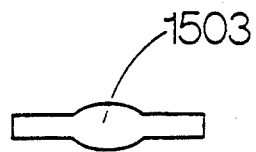
FIG. 15 is a schematic diagram showing the shape of a hole, which may be required in certain occasions on the objects to be secured to each other in a preferred embodiment of this invention.

In operation, the first fastening member 10 is initially caused to connect the two objects 1 and 2 by any number of different ways. This may be performed for example by hammering the first fastening member through both objects, if both objects are soft enough to allow this hammering operation. Otherwise, one or both objects may have appropriate openings to allow insertion of member 10 through them. An example of such an opening 1503 is shown in FIG. 15. Depending on the cross section of the first fastening member 10, an appropriate opening may be provided, if necessary, such as round, square, rectangular, and the like, as well as combinations thereof. It is also anticipated by the instant invention that the first fastening member may be an integral part of one of the objects to be secured on each other. Insertion of member 10 through both objects only loosely holds the two objects together, and it is considered as an operation of a preliminary connection. After this connection has been established, the second fastening member 60 is inserted through opening 14 of the first fastening member 10, preferably by hammering. During this second hammering operation, second member 60 is guided by the continuation of the walls 30 of aperture 14 to follow a straight direction within the first fastening member. As the second fastening member 60 proceeds further within member 10, tip 63 and tapered wall 61 of pointed front end 66 meet the entry 28, thus initiating opening or spreading of expanding bodies 20 and 22. Upon further insertion, the pointed front end 66, and then the exterior portion 62 meet the continuation 32 of entry 28, which continuation also acts as a guide to direct the second fastening member 60 in a straight direction. When the pointed front end 66 approaches the first engaging edge 24, as shown in FIG. 14, tip 25 of engaging edge 24 should preferably be within the volume of a cylinder having as axis of symmetry the center axis X—X', and radius R the distance between the back point 76 and axis X—X'. If the expanding bodies have then assumed their highest opening, this condition will render the first engaging edge 24 to be adaptable to apply pressure to any point of the bottom of the recessed surface that the first engaging edge is in contact with and the distance of which from the center axis X—X' is equal or greater than that of the distance of the back point 76 from said back axis X—X'.

As the second fastening member 60 proceeds further, the first engaging edge 24 will meet the tapered wall 61 of the pointed front point 66, and it will be forced to ride along and over it until it finds itself on the leading recessed engaging surface 70. Depending on the location at which it will enter the leading recessed area 70, the engaging edge 24 with its tip 25 may either hit active wall 80 or it may go directly to the common back point 76, as member 60 is hammered further in. If it hits the active wall 80, it will cause wall 80 to be guided by the engaging edge 24. In other words, the second fastening member will be caused to turn accordingly, so that the wall 80 will follow the stationary engaging edge 24. This turning of the second fastening member 60 will result in dropping the tip 25 of the engaging edge 24 into the bottom of the common back point 76, as shown in FIG. 12. Thus, regardless of the radial orientation of the second fastening member 60, when it enters the aperture 14 of the first fastening member 10, the tip 25 of the engaging edge 24 will end up at the bottom of the common back point 76.

Since back point 76 has the lowest bottom than any adjacent point, and pressure is applied by the engaging edge 24, and since no other major force is applied on the second fastening member 60 towards extracting it from the first member 10, said second member will remain at this low energy position, even in environments subjected to vibration. All forces that may be created to separate the first from the second object are absorbed by the first fastening member 10 alone. As a matter of fact, a force to pull the first object 1 away from the second object 2, will tend to close expanding members 20 and 22, which in turn will induce higher pressure from the engaging edge 24 to back point 76, which will increase the tendency of the second fastening member 60 to be retained within the firs member 10.

Although it is important for the back point to have a bottom closer to the center axis than any adjacent points, it is indifferent as to the height of points behind the back point, that is points between the back point 76 and head 12, since the engaging edge 24 can never reach such points, due to the stop that first head 10 imposes on second head 64. If object 2 is very thin, it may be designed to have locally thicker portions (not shown) on its back side, away from object I, around the bore through which the first fastening member 10 is intended to pass, so that the first fastening member may provide a firmer grip. The locally thicker portions may be continuous or split around their walls to provide a desired resilience level, or they may even be of different material adhered to object 2. Such configurations may find use in the case of automotive and other panels.

When it becomes desirable to separate the two objects, a screw driver or other appropriate driving tool, may be used to turn the second fastening member 60, approximately one turn, counterclockwise in the configuration shown in FIG. 12, by using slot 74, or other appropriate acceptor for the respective driving tool. By doing this, the active wall 80' of the retracting recessed surface 72 will follow the engaging edge 24, and the second member 60 will assume the position shown in FIG. 13, within the first fastening member 10. The second fastening member may then be removed by pulling its protruding portion either manually or by means of a pair of pliers, and the like.

It is important to note that the height of the active walls should be large enough and precipitous to discourage jumping of the first engaging edge 24 over said walls. There are occasions, however, when jumping of the engaging edge over active walls is desirable. In addition, all active walls have a tangent, the projection of which on a plane containing the center axis and being parallel to the tangent, forms an angle with the center axis smaller than 90 degrees. This is so for the engaging edge, being a guide for the active walls, to cause the second fastening member to move forward or backward when the active wall follows the edge 24. In the case that the angle is 90 degrees, turning of the second fastening member 60 would not cause any movement of said second member 60 forward or backward with respect to the first fastening member 10.

The difference in function and operation between the active wall 80 of the leading recessed surface 70 and the active wall 80' of the retracting recessed surface 72 is the following in the presence of distinct (not a surface considered to be both leading and retracting at the same time) leading and retracting recessed engaging surfaces:

The coaction of engaging edge 24 and wall 80 results in turning of the second fastening member 60 as said second member 60 is being pushed inward through aperture 14, so that when finally the second member 60 is completely inserted, the tip 25 of the engaging edge 24 drops into common back point 76. This is facilitated by a relatively small angle between the tangent of the leading wall and the center axis, the angle preferably being between 45 and 10 degrees, and more preferably between 30 and 20 degrees, while in contrast the coaction of engaging edge 24 and wall 80' results in moving the second fastening member 60 outwardly through aperture 14 as said second member 60 is being turned counterclockwise in the case of FIGS. 12 and 13. This is facilitated by a relatively large angle, the angle preferably being between 45 and 80 degrees, and more preferably between 60 and 70 degrees.

Figure 8A:
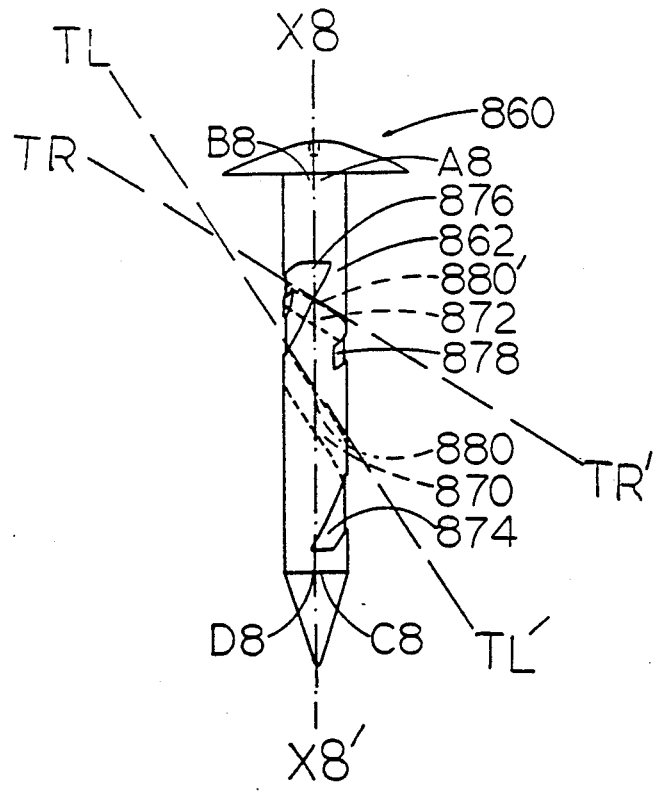
FIG. 8(a) is a schematic diagram showing the front view of the second fastening member of another embodiment of the present invention.
Figure 8B:
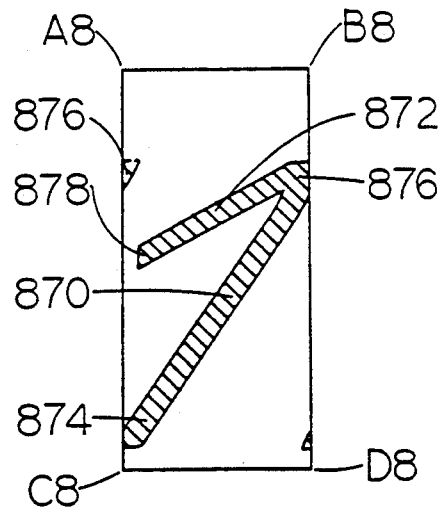
FIG. 8(b) is a schematic diagram showing a view of the surface of the main body of the second fastening member of FIG. 8(a) if said surface were unfolded from a line coinciding with the intersection of the surface and a plane passing through the center axis and being perpendicular to the plane of the paper.

These relations are better illustrated in the embodiment of FIG. 8, where there is shown a second fastening member 860 having a leading recessed surface 870 with a front point 874, a common back point 876, and an active wall 880. Tangent TL—TL', corresponding to active wall 880, forms an angle w with the center axis X8—X8'. Also, the second fastening member 860 has a retracting recessed surface 872 with a front point 878, a common back point 876, and an active wall 880'. Tangent TR—TR', corresponding to active wall 880', forms an angle y with the center axis X8—X8'. It may be seen that both angles are smaller than 90 degrees, and that angle w is smaller than angle y.

Two intersecting lines form always two angles on the same side of either line, the two angles having a sum of 180 degrees. Thus, one of the two angles is smaller than 90 degrees and the other greater than 90 degrees if the angles are not equal to each other, or in other words, 90 degrees each. For simplicity purposes and to avoid confusion, the smaller of the two angles formed by each of the tangents referred to hereinabove and the center axis are the only ones considered for all embodiments, implicit or explicit, of the instant invention.

The operation of the embodiment involving the second fastening member 860 of FIG. 8 in a device as shown in FIGS. 12 through 14, is very similar to that involving the second fastening member 60 of FIG. 6. Since the leading recessed surface 870 is in the form of a spiral completing a full cycle, the first engaging means 24 (FIG. 12 for example) will necessarily fall into some part of the spiral-like leading recessed area 870, as the second fastening member is being inserted into the first fastening member. In sequence, the wall 880 will be guided by the first engaging edge 24, forcing the second member to turn accordingly, and thus forcing the tip 25 of engaging edge 24 to drop into common back point 876. When it is desired to remove the second fastening member from the first fastening member, the same procedure as described in the embodiment of FIGS. 5, 12, 13, and 14 may be followed. I is worth noting that the front point 878 of the retracting recessed surface 872 does not directly communicate with the leading recessed surface 870, in contrast with the embodiment of FIG. 5.

The embodiment shown in FIG. 6 has a similar configuration as that in the case of FIG. 5, except that the active wall 680 of the leading engaging recessed surface 670 has a zig-zag shape, so that if the first engaging edge 24 jumps accidentally on the high level exterior portion 762 over position 711, it will inevitably fall back into the leading recessed area 670, and go again against the next part of wall 680 until it finally drops into the common back point 676.

Figure 7B:
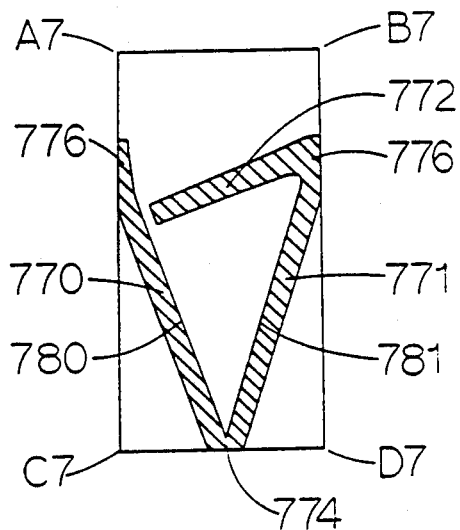
FIG. 7(b) is a schematic diagram showing a view of the surface of the main body of the second fastening member of FIG. 7(a) if said surface were unfolded from a line coinciding with the intersection of the surface and a plane passing through the center axis and being perpendicular to the plane of the paper.

The embodiment of FIG. 7 has a similar configuration as that illustrated in the embodiment of case 8, except that there are provided two leading recessed surfaces 770 and 771 with active walls 780 and 781, respectively, in the form of spirals possessing only half cycle each, and having a common front point 774 in addition to the common back point 776.

Figure 9A:
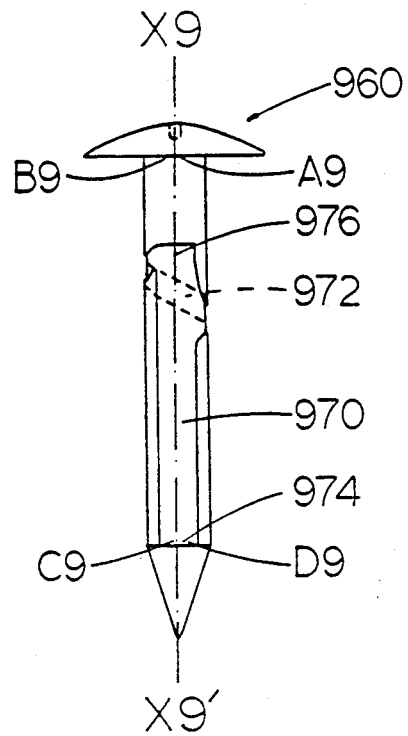
FIG. 9(a) is a schematic diagram showing the front view of the second fastening member of another embodiment of the present
Figure 9B:
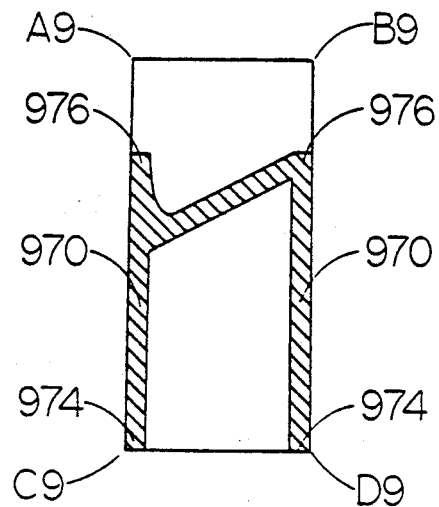
FIG. 9(b) is a schematic diagram showing a view of the surface of the main body of the second fastening member of FIG. 6(a) if said surface were unfolded from a line coinciding with the intersection of the surface and a plane passing through the center axis and being perpendicular to the plane of the paper.

The straight shape of the leading recessed surface 970 in the case of the embodiment illustrated in FIG. 9 requires that the second fastening member 960 be inserted in the first fastening member in a way that the first engaging edge meets the leading recessed surface 970 at the front point 974 of said recessed surface 970 so that the first engaging edge will drop into the common back point 976 upon complete insertion of the second fastening member into the first fastening member. To ensure such a requirement, the aperture 14 on the first fastening member may be designed to match the cross sectional profile of the second fastening member 960, so that member 960 can only be inserted in only one rotational position.

Figure 10A:
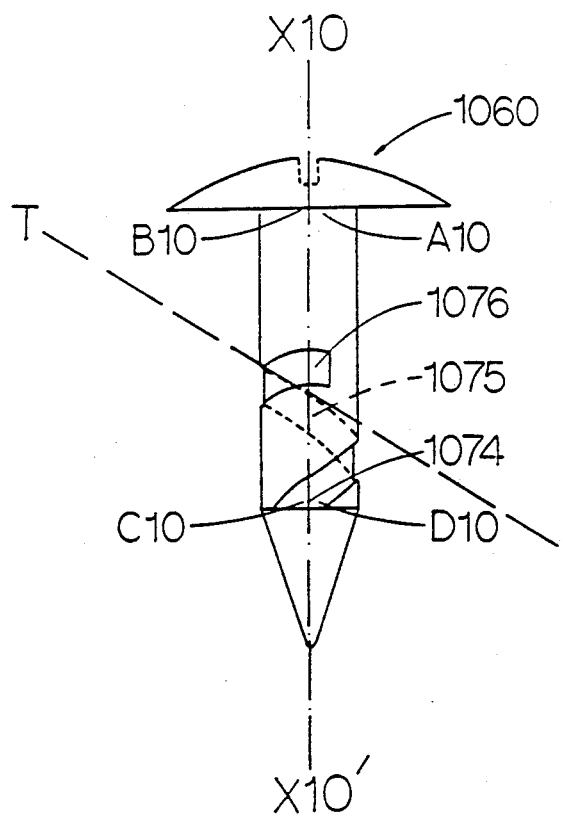
FIG. 10(a) is a schematic diagram showing the front view of the second fastening member of still another embodiment of the present invention.
Figure 10B:
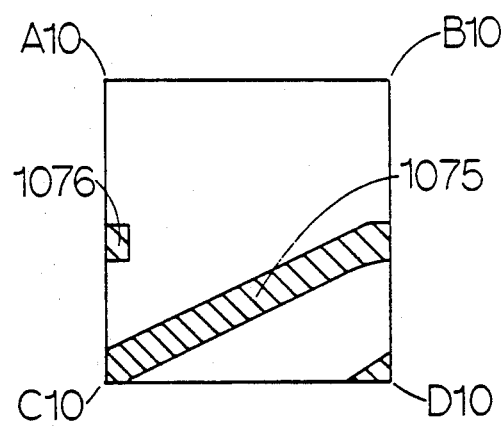
FIG. 10(b) is a schematic diagram showing a view of the surface of the main body of the second fastening member of FIG. 10(a) if said surface were unfolded from a line coinciding with the intersection of the surface and a plane passing through the center axis and being perpendicular to the plane of the paper.

The embodiment of FIG. 10 illustrates a second fastening member 1060, in which the leading and the retracting recessed surfaces are one and the same recessed engaging surface 1075. In the case of this embodiment, it is preferable to maintain a rather large angle z to exist between the center axis X10—X10' and tangent T—T' on the active wall of the common recessed surface 1075. Thus, it is also preferable that both the insertion and the retraction or removal of the second fastening member from the first fastening member be by turning in the appropriate direction the second fastening member 1075, instead of using other ways such as hammering. Although it is preferable to utilize in this case spiral recessed surfaces of a limited number of turns, including part of a turn, a regular screw type configuration may also be used, as long as it possesses a back point, and meets the requirements set forth in the claims of this invention.

Figure 11:
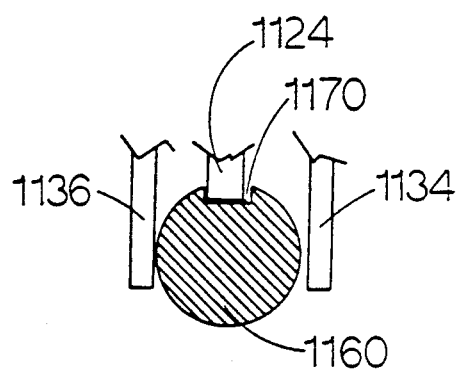
FIG. 11 is a schematic diagram of a cross section of the second fastening member with its recessed engaging surface in engagement with the engaging edge of the first fastening member, the second fastening member being directed in a straight mode by the guide shown in FIG. 3.

An enlarged semi cross sectional view of the configuration of the first engaging edge 324 in relation to guide formed by bent portions 334 and 336 as illustrated in FIG. 3, is shown in FIG. 11, where a cross section of the second fastening member 1160 and the leading recessed surface 1170 is illustrated in addition to the first engaging edge 1124 and the guide comprising bent portions 1134 and 1136.

Figure 18:
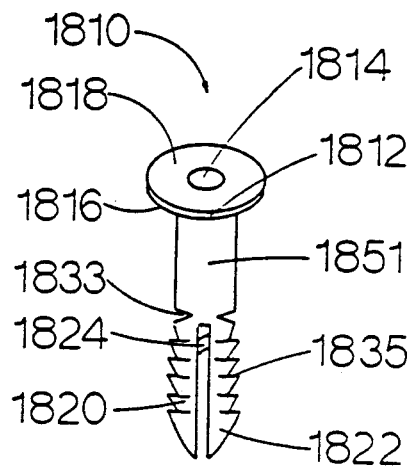
FIG. 18 illustrates an example of a perspective view of a substantially round plastic first fastening member according to an embodiment of the instant invention.
Figure 19:
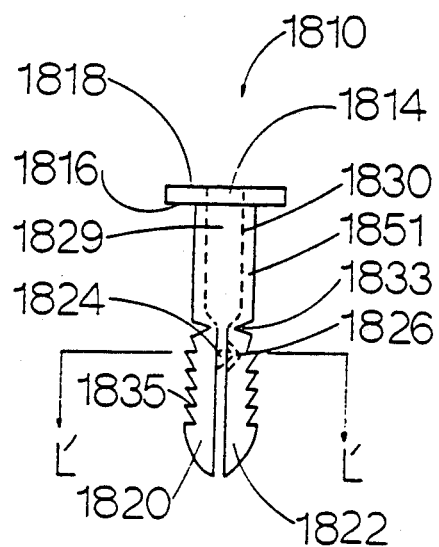
FIG. 19 shows the front view of the embodiment illustrated in FIG. 18.
Figure 20:
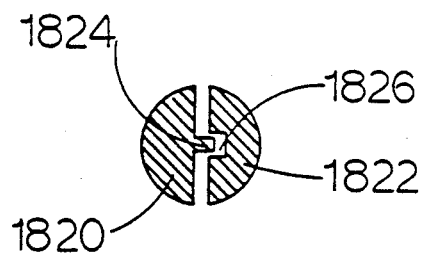
FIG. 20 shows the cross section of the first fastening member at line L'—L' in FIG. 19.

It should be understood that not only metals but also plastics and any other suitable construction materials and combinations thereof may be used to make the components of the fastening device of the present invention, including both the first and the second fastening members. An example of a first fastening having a substantially round configuration, and made out of plastic material is illustrated in FIGS. 18, 19 and 20. The first fastening member 1810 comprises a first head 1812. Head 1812 has an aperture 1814, an inside surface 1816, and an outside surface 1818. The aperture 1814 extends throughout the first head 1812 and the neck 1851. Member 1810 has also a pair of expanding bodies 1820 and 1822, which are flexibly connected to the neck 1851, and they extend in a direction generally perpendicular to a plane containing the inside surface 16 of the first head 1812. The expanding bodies 1820 and 1822 are disposed generally in transverse relation with respect to each other, in a way that they are forced to open upon insertion of the second fastening member 1860 into the first fastening member 1810 through the aperture 1814 from the first surface 1818. The length of the neck 1851 depends on the nature and dimensions of the objects to be secured, and it is subject of the particular design. The expanding bodies have barbs 1835 for better anchorage. At the point of their connection to the neck 1851, grove 1833 is employed to allow easier bending of the expanding bodies.

Expanding body 1820 has an engaging edge 1824. As shown in FIGS. 19 and 20, engaging edge 1824 may be a protrusion nesting in a respective cavity 1826 in expanding body 1822.

The operation of the different aforementioned embodiments is very similar to the operation described for the embodiment shown in FIGS. 1, 2, 5, 12, 13, and 14, and it does not need further explanations, additional to ones which have already been presented.

Figure 21:
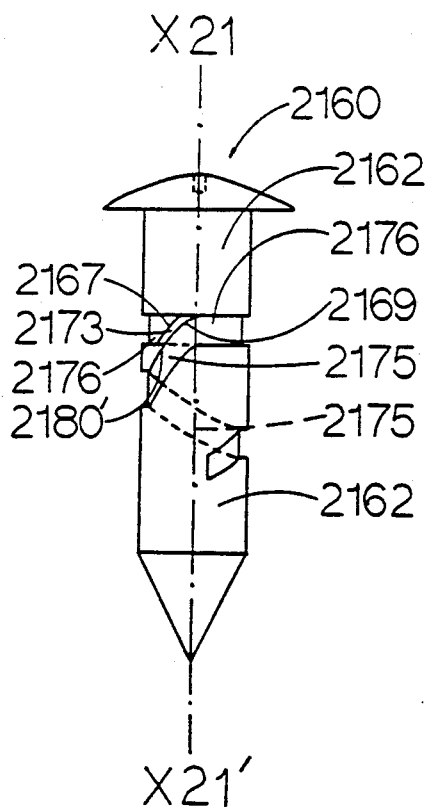
FIG. 21 shows a preferred configuration of the second fastening member, wherein the back point of the retracting recessed engaging surface has extended dimensions around the periphery of the exterior portion of the second fastening member.
Figure 22:
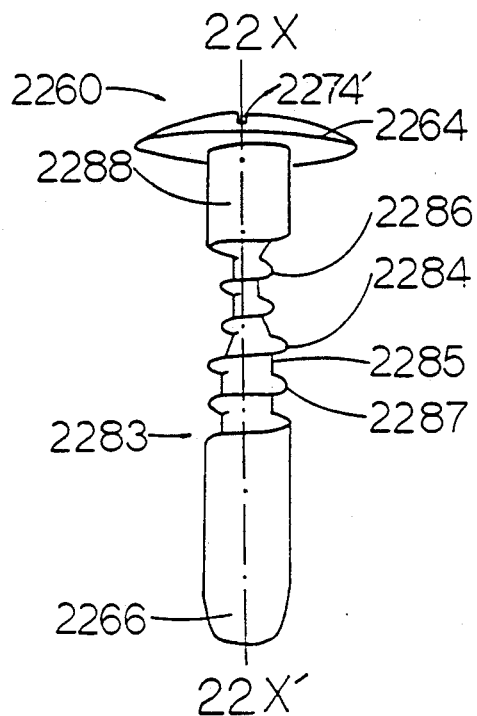
FIGS. 22 to 25 depict different preferred multithread configurations of the second fastening member.

The most preferred configuration of the second fastening member 2160, in the category of fasteners having elongated bodies of "particular appearance" category according to the instant invention, is illustrated in FIG. 21. According to this embodiment, the back point 2176 of the retracting recessed surface 2175 is extended around most part of the periphery of the exterior portion 2162. It actually starts at wall 2169, which is part of the active wall 2180', and which is a precipitous wall. It goes all the way around the periphery, and ends at wall 2167, which may be a gradual wall, if desired. Surface 2173 between walls 2167 and 2169 is somewhat recessed, but not as deep as the surface corresponding to the back point 2176. There is no necessity of a distinct leading recessed engaging surface according to this embodiment. The preferred way of inserting the second fastening member 2160 in a first fastening member of the type described in the previous embodiments is by pushing, such as hammering and the like, and not by turning.

In operation of this embodiment, two objects are initially connected by a first fastening member, as already described in previous embodiments, and the second fastening member 2160 is inserted in the first fastening member by a pushing force, such as hammering and the like. Since there is no leading recessed engaging surface, the engaging edge of the first member will follow an undetermined path on the exterior portion, and it may be necessary to cross active or other types of walls finding in its path. To facilitate this cross over, it is preferable in this case that the engaging edge of the first member be disposed toward the exterior and recessed surfaces in a substantially right angle relative to said surfaces, as compared to the oblique angle, which is preferable in the case of other embodiments. After the engaging edge of the first fastening member passes over these walls, it lands at some point belonging to the back point, or on 2173, or on gradual wall 2167. Regardless of where it lands, the first fastening member will not have a tendency to be exerted from the first fastening member, since all these points and surfaces are recessed as compared to points and surfaces in front of them, that is toward the front point (not shown) of the first fastening member 2160. Upon coincidental or deliberate vibration the tip of the engaging edge will fall within the boundaries of the back point, even if it has landed on surface 2173. This will further provide additional resistance against vibrational or other accidental removal of the second member from the first member.

When it becomes desirable to separate the two objects from each other, removal of the second fastening member is conducted by turning the second fastening member 2160 counterclockwise within the first fastening member. Wether the turning should be clock- or counterclockwise, of course, depends on the direction of the spiral configuration of the active wall. In any event, when the engaging edge reaches precipitous wall 2169 during turning, it will follow the path of active wall 2180', and the second fastening member will start moving in a direction away from the first fastening member. If the retracting surface has only a few turns, the rest of the removal may be conducted by pulling the rest part of the second fastening member by using any conventional means, such as a pair of pliers and the like, or even manually in certain occasions. If, on the other hand, if it has an adequate number of turns to reach the pointed front end, additional pulling is not necessary.

The angle of the tangent of the active wall of the retracting recessed surface 2175 with the center axis X21—X21' in this embodiment should be preferably large so that both cross over of the engaging edge over the active walls during inward pushing of the second fastening member, and movement of the second fastening member in a direction away from the first member during turning said second member, will be facilitated.

Figure 16:
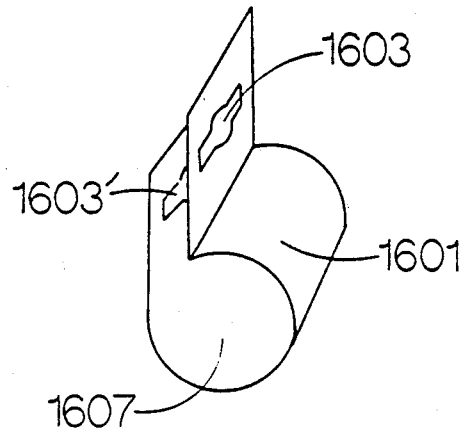
FIG. 16 is a schematic diagram showing an exemplary object which may be secured on a second object by the device of the present invention.

FIG. 16 illustrates an example of a simple application performed according to the present invention. The object illustrated is a wire holder for hollow walls, plaster walls, dry walls, and the like. The wire or cable is first inserted in retainer 1607; the two openings 1603 and 1603' are aligned; a first fastening member is passed through the aligned openings, and it is hammered on a dry wall; and a second fastening member is inserted into the first fastening member, also by hammering, thus securing the cable and the holder on the wall in a vibration proof configuration. If it becomes desirable to remove the wire and the holder from the wall, the first fastening member is turned counterclockwise by about a turn, and the newly protruded second fastening member is pulled away with a pair of pliers.

Figure 17:
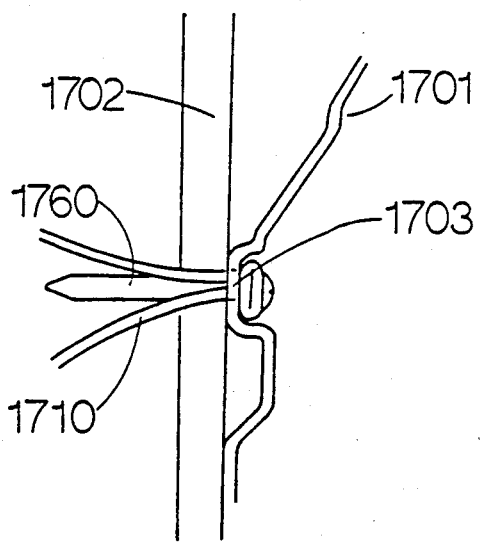
FIG. 17 is a schematic diagram showing still another exemplary object being on a dry wall by the fastening device of the instant invention.

FIG. 17 illustrates an additional example of another application using the teachings of this invention. Hook 1701 intended to accept and further secure bathroom fixtures, as shown in FIG. 17, has itself already been secured on dry wall 1702 by passing first member 1710 through a suitable opening 1703 on the hook, hammering the first fastening member through the dry wall, and inserting the second fastening member 1760 into the first fastening member 1710, again by hammering. The bathroom fixture is in sequence passed over and secured on the hook.

Other examples include but are not limited to securing curtain rods on walls, hanger rods on walls, automotive parts and panels onto other parts and panels, or on the automobile frame or structure, construction structures on other structures in buildings, and the like.

As aforementioned, any tool may be used for the removal of the second fastening member 60, as long as the second head 64 has such shape as to be capable of being grasped by the tool and be turned.

Fasteners with Elongated Bodies of "Multithread Appearance"

The fastening devices of this category are in general more preferable than the ones described so far, because in most cases the elongated body of the second fastening member of this category may be made commercially faster by using conventional off-the-shelf machinery. In both categories, the first fastening member may be made faster also by the use of off-the-shelf conventional machinery.

In the preferred embodiments of this category of the present invention, a first fastening member 10 as the one illustrated in FIGS. 1, 2, and 4 may also be utilized, with the difference that the continuation 32 of the entry 28 may preferably be used exclusively as an engagement edge, and play the role of element 24. Under these circumstances, the element 24 should be bent less, so that it does not interfere with the insertion or extraction of the second fastening member to the first fastening member. Thus, it might only be utilized to keep the blades 20 and 22 closed during heat treatment as explained in U.S.

Pat. No. 4,941,340, for example. First fastening members may also be made of plastic or any other construction material as discussed in the previous category. An example is a member of the type shown in FIGS. 18 and 19 with usually a shorter and less angled engagement edge 1824.

The second fastening member 2260 comprises an elongated body 2283, which has a head 2264 at one end and a leading point 2266 at the opposite end. The head 2264 has a shape adaptable to be turned by a driving tool. This may be done for example through a slot 2274' in conjunction with a screwdriver, for example. Along at least part of the elongated body 2283 there is threadline with threads 2284 with the requirement that the diameter of the threadline decreases at least along part of the threadline in a direction from the leading point 2266 toward the head 2264. Thus, the threads 2286 toward the side of the head have a smaller diameter than the threads 2284. In this particular case, the diameter of the threads decreases gradually. Radius of the thread at a certain position is defined as the distance between the top (such as 2287) of the thread at that position and the center axis (such as 22X—22X'). Diameter of the thread or the threadline at a certain position is the radius at the same position multiplied by 2. Similarly, radius of the bottom of the thread at a certain position is defined as the distance between the bottom (such as 2285) of the thread at that position and the center axis (such as 22X—22X').

At the portions where the threadline decreases in diameter, it is preferable that the depth of each thread, defined as the difference between the top (such as 2287) and the bottom (such as 2285) of the thread at a certain position, does not decrease by more than 80%, more preferably by more than 60%, and even more preferably by more than 40% per turn. It is also preferable that the diameter of the thread does not decrease by more than 60% per turn, more preferably by more than 30% per turn, and even more preferably by more than 20% per turn. If the decrease in depth is higher than 80% per turn, or if the decrease in diameter of the thread is higher than 60% per turn, one or more of the advantages of this invention may suffer. It is also preferable that the decrease of the thread depth and thread diameter are higher than 1% more preferable higher than 2%, and even more preferable higher than 5%. It is further preferable that the decrease of the diameter of the threadline, at the portions where the threadline diameter decreases, is gradual.

Figure 23:
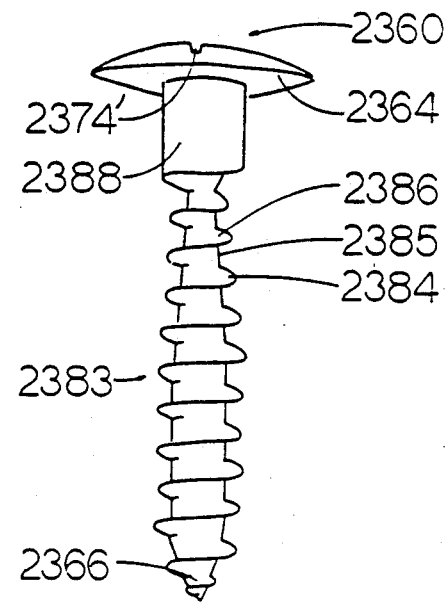
Figure 24:
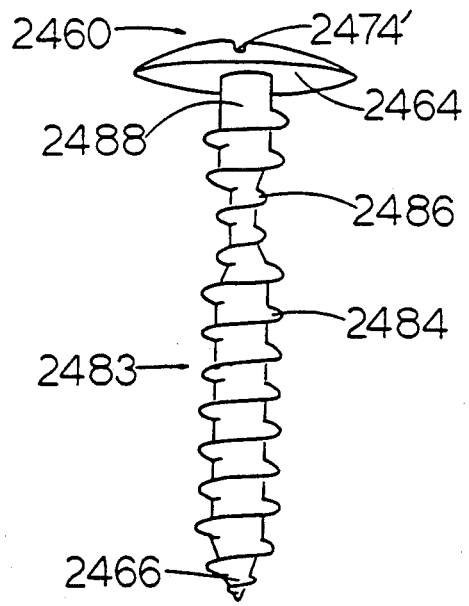

FIG. 23 and 24 illustrate a fastening member, wherein the threadline extends from the leading point 2366 to the neck 2388 of the elongated body 2383 In these cases also, a number of threads 2386 disposed toward the second head 2364 have smaller diameter than threads 2384 toward the leading point 2366.

In the above three cases, both the diameter of threadline and the diameter of the bottom of the threads change.

Figure 25:
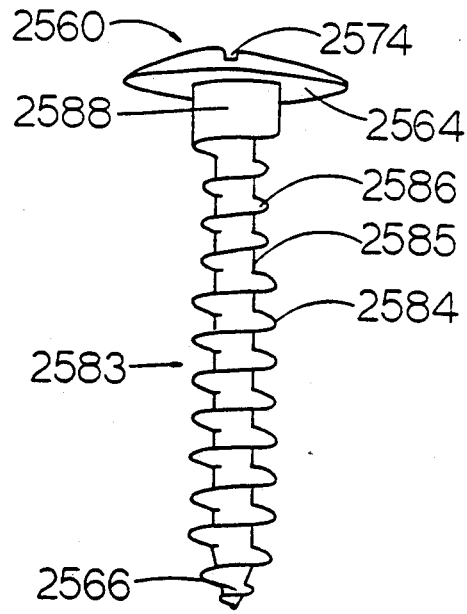

FIG. 25 illustrates another embodiment of this invention, where the diameter of the bottom 2885 of the threads remains substantially constant over the length of the elongated body 2583, except at the neck 2588 and adjacent the leading point 2566.

Figure 26A:
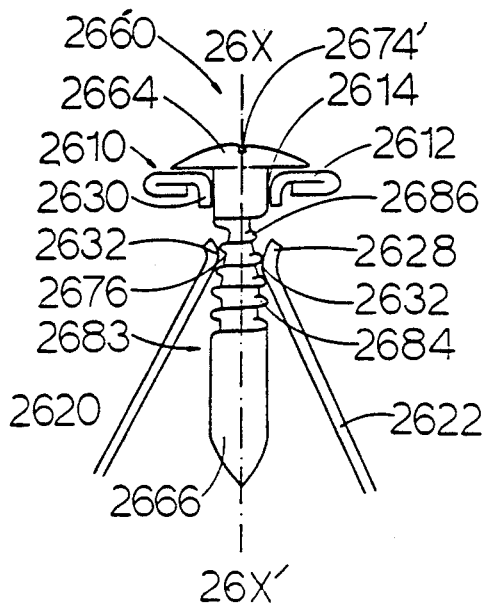
FIG. 26(a) illustrates the most preferred embodiment of a fastening device according to this invention, with the second fastening member completely inserted in the first fastening member.
Figure 26B:
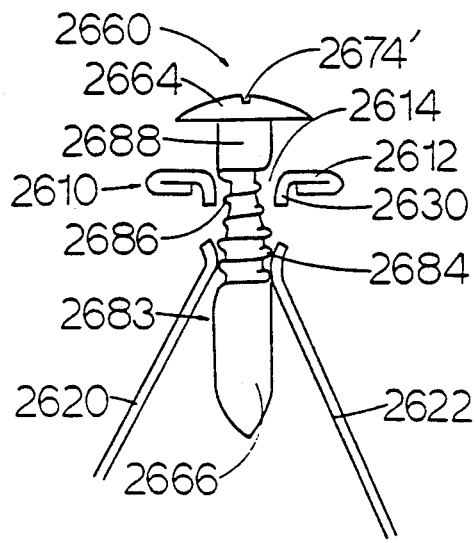
FIG. 26(b) illustrates the fastening device of FIG. 26(a) with the second fastening member partially removed from or inserted to the first fastening member.

FIG. 26a and 26b illustrate the most preferred embodiment.

There is provided a first fastening member 2610, in which a second fastening member 2660 has been inserted in order to expand the blades or expanding bodies 2620 and 2622 of the first fastening member 2610.

The first fastening member 2610 is similar to the one illustrated in FIGS. 1, 2, and 4, with the difference that the continuation 32 (in this case 2632) of the entry 28 (in this case 2628) is used as an engagement edge, and element 24 is not utilized. Thus, the first fastening member 2610 has a head 2612. The head 2612 has an aperture 2614, and expanding bodies 2620 and 2622, which are connected to the first head and extend away from it. The expanding bodies 2620 an 2622 have each a bent portion 2632, which serves as an engagement edge. Preferably, the first fastening member 2610 has also a guide 2630, which may be the continuation of the walls of aperture 2614. The guide 2630 serves the purpose of guiding the second fastening member 2660 in a straight direction or path within the first fastening member 2610.

The second fastening member 2660 comprises an elongated body 2683, commensurate to aperture 2614, which has a second head 2664 at one end and a leading point 2666 at the opposite end. The head 2664 has a shape adaptable to be turned by a driving tool. This may be done for example through a slot 2674' in conjunction with a screwdriver, for example. Along at least part of the elongated body 2683 there is threadline with threads 2684 along part of the elongated body 2683. The diameter of the threadline decreases in a direction from the leading point 2666 toward the head 2664. Thus, the threads 2686 toward the side of the head have a smaller diameter than the threads 2684. In this particular case, the diameter of the threads decreases gradually. The elongated body in this case has also a neck 2688.

In operation of this embodiment, the first fastening member 2610 is initially caused to connect two objects by any number of different ways. This may be performed for example by hammering the first fastening member through both objects, if both objects are soft enough to allow this hammering operation. Otherwise, one or both objects may have appropriate openings to allow insertion of member 2610 through them. An example of such an opening 1503 is shown in FIG. 15. Depending on the cross section of the first fastening member 2610, an appropriate opening may be provided, if necessary, such as round, square, rectangular, and the like, as well as combinations thereof. It is also anticipated by the instant invention that the first fastening member may be an integral part of one of the objects to be secured on each other. Insertion of member 2610 through both objects only loosely holds the two objects together, and it is considered as an operation of a preliminary connection. After this connection has been established, the second fastening member 2660 is inserted through opening 2614 of the first fastening member 2610, preferably by a direct pushing force, such as for example hammering. During this operation, the second fastening member 2660 is guided by the continuation of the walls 2630 of aperture 2614 to follow a straight direction within the first fastening member. As the second fastening member 2660 proceeds further within member 2610, the pointed or leading front end 2666 meets and passes first the entry 2628, and then the continuation or bent portion 2632, thus causing opening or spreading of expanding bodies 2620 and 2622. The second fastening member 2660 is finally inserted completely in the first fastening member 2610. At this position, the bent 2632, which acts as an engagement edge, is in yielding cooperation with the threadline at an engagement position 2676 (FIG. 26a). The diameter of the threadline at position 2676 is smaller as compared to the diameter of the threadline in front of it toward the leading point 2666. In other words, the diameter of threads 2684 is larger than the diameter of threads 2686. The bent portions 2632 apply pressure on the threads 2686 of the screw or second fastening member 2660. This may be the result of the springiness of the expanding bodies of the first fastening member, or the result of the external pressures applied by the objects to be joined, or both. The direction of the pressure applied is preferably substantially normal to the direction of center axis 26X—26X'. As aforementioned, the engagement is yielding engagement and not rigid engagement, so that it allows the threads 2684 to slip through the bent portions 2632 (acting as engagement edges) when high enough direct pushing insertion force is applied on the second fastening member. The yielding engagement may be achieved by preferably using a wide-angle bent engagement edge, such as portion 2632, which rides or floats on the threads rather than binding within them, as compared to a sharp engagement edge, which allows one way direct movement only, while it may allow turning movement in a threading manner.

When the second fastening member is completely inserted in the first fastening member, or in other words when the fastener or fastening device is in use, the bent portion 2632 acting as an engagement edge is at a low energy position (due to the reduced diameter of threads at point 2676) and prevents the second fastening member from accidental extraction, such as due to vibrations and the like.

When it becomes desirable to separate the two objects, a screw driver or other appropriate driving tool, may be used to turn the second fastening member 2660, counterclockwise in the configuration shown in FIG. 26, by using slot 2674, or other appropriate acceptor for the respective driving tool. By doing this, the bent portion 2632, acting as an engagement edge, will follow the path of the tread 2684, thus unscrewing the second fastening member 2660 from the first fastening member 2610. The second fastening member may be unscrewed so that the second head 2264 is forced to be partially advanced away from the first head 2612 (FIG. 26b), and then is totally removed by pulling its protruding portion either manually or by means of a pulling tool, such as for example a pair of pliers, and the like. The yielding engagement employed here, combined with the other parameters of the present invention, renders insertion and extraction of the second fastening member very fast.

Figure 27:
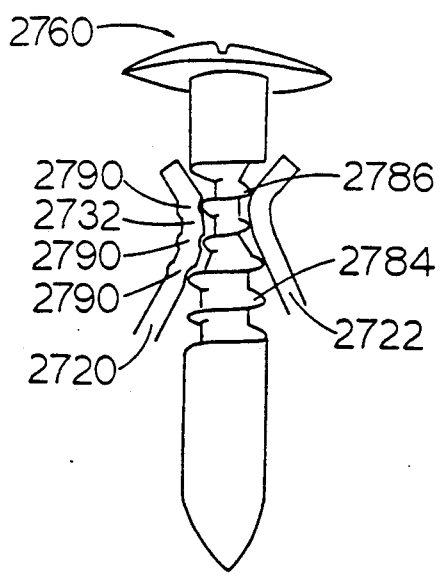
FIG. 27 is a fractional view of another preferred embodiment of this invention.

Instead of a plain bent portion 2632, which acts as an engagement edge, one with grooves or turns 2790 may be used in a different embodiment of this invention, as better illustrated in FIG. 27, where only the bent portion 2732 of the first fastening member 2710 is shown (for purposes of clarity) in an engagement position with the second fastening member 2760.

The engagement edge 2732 in this embodiment has thread accepting grooves 2790. It is preferable that the grooves 2790 are adequately shallow as not to interfere with the direct (straight without turning) insertion or extraction of the second fastening member into the first fastening member.

The operation of this embodiment is substantially identical to the one shown in FIG. 26.

Figure 28:
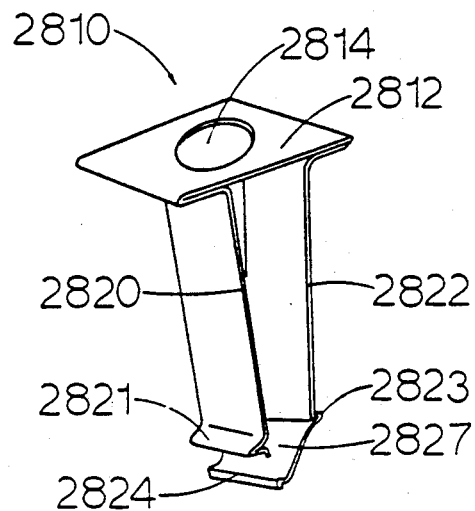
FIG. 28 shows a perspective view of another example a first fastening member.
Figure 29:
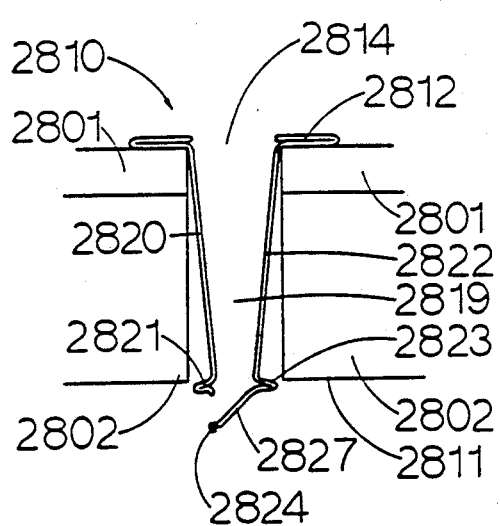
FIG. 29 shows the first fastening member of FIG. 28 placed in an opening of two objects.
Figure 30:
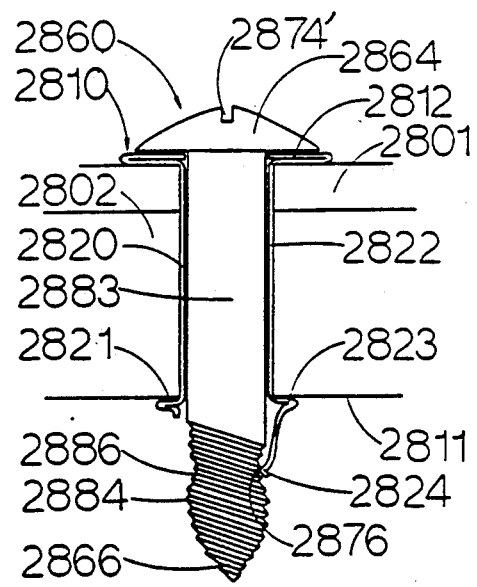
FIG. 30 shows a fastening device according to this invention utilizing the first fastening member shown in FIGS. 28 and 29, in combination with a second fastening member.

FIGS. 28-30 illustrate an additional example of a fastening device in accordance with this invention.

There is provided a first fastening member 2810 comprising a first head 2812, and expanding bodies 2820 and 2822, flexibly connected at an angle to the first head at one end, and extending away from the first head 2812. The first head 2812 has an aperture 2814. The expanding body 2822 is connected to a flexible portion 2827 at the other end, through a restricting bent 2823. The flexible portion 2827 contains an engagement edge 2824. The other expanding body 2820 also has a respective restricting edge 2821.

FIG. 29 illustrates the first fastening member 2810 inserted in an opening 2819, the opening extending through the thickness of a first object 2801 and a second object 2802. The opening 2819 is large enough to accept the expanding bodies 2820 and 2822, which are at an angle with the first head 2812, so that the restrictive bents 2821 and 2823 do not spontaneously move under the bottom 2811 of the second object 2802.

FIG. 30 illustrates the configuration of FIG. 29 after a second fastening member 2860 has been completely inserted into the first fastening member 2810. The second fastening member 2860 comprises an elongated body 2683 having a second head 2864 at one end, which in turn has a slot 2874, by means of which the second fastening member 2860 may be turned with a driving tool, such as a screwdriver, and the like. The elongated body 2883 has a leading point 2866 at the opposite end, which is preferably beveled, as shown in FIG. 30, but it may also have other shapes, such as round, flat, and the like. Further, the elongated body 2883 has a threadline 2884 along part it. The diameter of the threads 2886 is smaller at an engagement position 2876 of the engagement edge 2824 with the threads 2886, as compared to the diameter of the threads 2884 in front of it toward the leading point 2866.

In operation of this embodiment, the first fastening member 2810 is initially inserted through the common opening 2819 of the first object 2801 and the second object 2802. After this insertion has been established, the second fastening member 2860 is inserted through opening 2814 of the first fastening member 2810, by a direct pushing force, without the need to turn any of the fastening members. As the second fastening member 2860 proceeds further within member 2810, the pointed or leading front end 2866 meets and pushes away the flexible portion 2827. In sequence, the engagement edge 2824 slides over the threads 2884, and finally lands in the engagement position 2876, when the second fastening member 2860 has finally been completely inserted in the first fastening member 2810. At this position, the engagement edge 2824, is in yielding cooperation with the threadline. The diameter of the threadline at position 2876 is smaller as compared to the diameter of the threadline in front of it toward the leading point 2866. In other words, the diameter of threads 2884 is larger than the diameter of threads 2886. The engagement edge 2824 applies pressure on the threads 2886 of the special screw or second fastening member 2860. This is the result of the springiness or flexibility of the flexible portion 2827. The direction of the pressure applied is preferably substantially normal to the direction of the second fastening member 2860. As aforementioned, the engagement is yielding engagement and not rigid engagement, so that it allows the threads 2884 to slip through the bent portions 2832 (acting as engagement edges) when an adequately high direct pushing insertion force is applied on the second fastening member. The yielding engagement may be achieved by preferably using a wide-angle bent engagement edge, which rides or floats on the threads rather than binds within them. When the second fastening member is completely inserted in the first fastening member, or in other words when the fastener or fastening device is in use, the engagement edge 2824 is at a low energy position (due to the reduced diameter of threads at point 2876) and prevents the second fastening member from accidental extraction, such as due to vibrations and the like. Also, the restriction bents 2821 and 2823 with the head 2810 secure the two objects together.

When it becomes desirable to separate the two objects, a screw driver or other appropriate driving tool, may be used to turn the second fastening member 2860 in an appropriate direction, by using slot 2874. By doing this, the engagement edge 2824 follows the path of the thread 2884, thus unscrewing partially or totally the second fastening member 2860 from the first fastening member 2810. The second fastening member may be unscrewed enough, so that the second head 2264 is forced to be partially advanced away from the first head 2812. Then, the second fastening member 2860 is totally removed by pulling its protruding portion either manually or by means of a pulling tool, such as for example a pair of pliers, and the like. The yielding engagement employed here, combined with the other parameters of the present invention, renders the fastening device substantially vibration proof, and insertion or extraction of the second fastening member very fast.

The vibration proof characteristics of the devices of both categories of this invention, the ease of installation and the ease of removal are invaluable assets in numerous applications. Examples include but are not limited to securing curtain rods on walls, hanger rods on walls, automotive parts and panels onto other parts and panels, or on the automobile frame or structure, construction structures on other structures in buildings, electronic parts or devices on other electronic parts or devices, and in general any given object to another object.

It should be noted that numerals differing by multiples of 100 utilized to describe the different embodiments of this invention, represent the same elements, intended in general to perform substantially the same functions, and should be used as such for a better understanding of the different aspects of the instant invention. In some occasions, however, certain elements may perform more than one function. In addition, occasionally, in one embodiment they may preferably perform one function and in another embodiment they may preferably perform a different function.

Examples of embodiments demonstrating the operation of the instant invention have been given for illustration purposes only, and should not be construed as restricting the scope or limits of this invention in any way.

What is claimed is:

1. A fastening device comprising in combination an assembly of a first fastening member and a second fastening member, the first fastening member being adapted to secure a first object to a second object when the second fastening member is inserted into the first fastening member;

the first fastening member comprising
a first head having an aperture; and
an expanding body having an engagement edge, the expanding body being connected to and extending away from the head;

the second fastening member comprising an elongated body having
an exterior portion,
a back end constituting a second head, the second head having such shape as to render the second fastening member turnable within the first fastening member,
a pointed front end opposite to the back end,
a diameter commensurate to the aperture of the first head of the first member, and
a center axis,
the exterior portion having
an optional leading recessed engaging surface having a continuity from a front point located towards the pointed front end to a back point located towards the second head, and
a retracting recessed engaging surface also having a continuity from a front point located towards the pointed front end to a back point located towards the second head,
the leading surface and the retracting surface having a common back point, with the option that the leading surface and the retracting surface may be one and the same engaging surface,
each recessed surface also having
a bottom throughout said recessed surface, the bottom being closer to the center axis at the back point than at any other point adjacent to the back point, excluding points behind the back point, and
an active wall adaptable to coact with and be guided by the first engaging edge, the active wall having a tangent, the projection of the tangent on a plane containing the center axis and being parallel to the tangent forming an angle with the center axis smaller than 90 degrees;

the first engaging edge of the first fastening member being adaptable to apply pressure to any point of the bottom of the recessed area that the first engaging edge is in contact with, and the distance of which from the center axis is equal or greater than that of the distance of the back point from said back axis; and the first engaging edge of the first fastening member and the back point being equidistant from the first head when the second fastening member is driven entirely through the aperture of the first fastening member.

2. A fastening device as defined in claim 1, wherein the bottom of the recessed engaging surfaces gradually advances closer to the center axis in a direction from a point between the front point and the back point towards the back point;

3. A fastening device as defined in claim 1, wherein the active walls of the recessed engaging surfaces are at least partially in the form of spirals around the center axis.

4. An assembly of a first object and a second object secured to each other by a fastening device as defined in claim 1.

5. An assembly as defined in claim 4, wherein the first fastening member extends through both objects.

6. An assembly as defined in claim 4, wherein the first fastening member is an integral part of the first object and extends through the second object.

7. A fastening device comprising in combination an assembly of a first fastening member and a second fastening member, the first fastening member being adapted to secure a first object to a second object when the second fastening member is inserted into the first fastening member;

the first fastening member comprising
- a first head having an aperture extending throughout the first head, an inside surface, and an outside surface,
- a guide on the side of the inside surface to direct the second fastening member in a straight direction within the first fastening member,
- a neck having two opposite ends and an opening extending from one end to the opposite end, the opening being substantially concentric with the aperture, one end being connected to the inside surface of the first head; and
- a pair of expanding bodies, at least one of the expanding bodies having an engaging edge, the expanding bodies being flexibly connected to the end of the neck opposite the end connected to the inside surface of the head, the expanding bodies extending in a direction generally perpendicular to a plane containing the inside surface of the head, the expanding bodies disposed in a generally transverse relation with respect to each other, such that the expanding bodies are forced to open upon insertion of the second fastening member into the first fastening member through the aperture from the first surface;

the second fastening member comprising an elongated body having
- an exterior portion, a back end constituting a second head and a pointed front end opposite to the back end, a diameter commensurate to the aperture of the first head of the first member, and a center axis, the exterior portion having
  - an optional leading recessed engaging surface having a continuity from a front point located towards the pointed front end to a back point located towards the second head, and
  - a retracting recessed engaging surface also having a continuity from a front point located towards the pointed front end to a back point located towards the second head,
  - the leading surface and the retracting surface having a common back point, with the option that the leading surface and the retracting surface may be one and the same engaging surface,
- each recessed surface also having
  - a bottom throughout said recessed surface, the bottom being closer to the center axis at the back point than at any other point adjacent to the back point, excluding points behind the back point, and
  - an active wall adaptable to coact with and be guided by the first engaging edge, the active wall having a tangent, the projection of the tangent on a plane containing the center axis and being parallel to the tangent forming an angle with the center axis smaller than 90 degrees;

the first engaging edge of the first fastening member being adaptable to apply pressure to any point of the bottom of the recessed area that the first engaging edge is in contact with, and the distance of which from the center axis is equal or greater than that of the distance of the back point from said back axis; and the first engaging edge of the first fastening member and the back point being equidistant from the first head when the second fastening member is driven entirely through the aperture of the first fastening member.

8. A fastening device as defined in claim 7, wherein the bottom of the recessed engaging surfaces gradually advances closer to the center axis in a direction from a point between the front point and the back point towards the back point;

9. A fastening device as defined in claim 7, wherein the active walls of the recessed engaging surfaces are at least partially in the form of spirals around the center axis.

10. An assembly of a first object and a second object secured to each other by a fastening device as defined in claim 7.

11. An assembly as defined in claim 10, wherein the first fastening member extends through both objects.

12. An assembly as defined in claim 10, wherein the first fastening member is an integral part of the first object and extends through the second object.

13. A fastening device comprising in combination an assembly of a first fastening member and a second fastening member, the first fastening member being adapted to secure a first object to a second object when the second fastening member is inserted into the first member;

the first fastening member comprising
- a first head having an aperture; and
- an expanding body having an engagement edge, the expanding body being connected to and extending away from the head;

the second member comprising an elongated body having
- a second head at one end, the second head having a shape adaptable to be turned by a driving tool;
- a leading point at the opposite end;
- a diameter commensurate to the aperture of the first fastening member; and
- threadline along at least part of the elongated body, with the requirement that the engagement edge is in yielding cooperation with and applies pressure on the threadline at an engagement position when the second member is completely inserted in the first member, so that
  - the second member may be inserted completely in the first member without the second member turning when an adequate direct insertion force is applied on the second member through the aperture, and
  - when the second head is turned by the driving tool in a preselected direction, after the second member has been completely inserted in the first member, the second head is forced to be at least partially advanced away from the first head, the diameter of the threadline becoming smaller at the engagement position as compared to the diameter of the threadline in front of it toward the leading point.

14. A fastening member as defined in claim 13, wherein the diameter of the threadline becomes smaller in a gradual fashion.

15. An assembly of a first object and a second object secured to each other by a fastening device as defined in claim 13.

16. An assembly as defined in claim 15, wherein the first fastening member extends through both objects.

17. An assembly as defined in claim 15, wherein the first fastening member is an integral part of the first object and extends through the second object.

18. An assembly as defined in claim 15, wherein one of the first and second objects is substantially an automobile and the other object is an automobile part.

19. A fastening device as defined in claim 13, wherein the first fastening member is in the form of stamped and folded sheet metal.

20. A fastening device comprising in combination an assembly of a first fastening member and a second fastening member, the first fastening member being adapted to secure a first object to a second object when the second fastening member is inserted into the first member;

the first fastening member comprising
- a first head having an aperture extending throughout the first head, an inside surface, and an outside surface,
- a guide on the side of the inside surface to direct the second fastening member in a straight direction within the first fastening member,
- a neck having two opposite ends and an opening extending from one end to the opposite end, the opening being substantially concentric with the aperture, one end being connected to the inside surface of the first head; and
- a pair of expanding bodies, at least one of the expanding bodies having an engaging edge, the expanding bodies being flexibly connected to the end of the neck opposite the end connected to the inside surface of the head, the expanding bodies extending in a direction generally perpendicular to a plane containing the inside surface of the head, the expanding bodies disposed in a generally transverse relation with respect to each other, such that the expanding bodies are forced to open upon insertion of the second fastening member into the first fastening member through the aperture from the first surface;

the second member comprising an elongated body having
- a second head at one end, the second head having a shape adaptable to be turned by a driving tool;
- a leading point at the opposite end;
- a diameter commensurate to the aperture of the first fastening member; and
- threadline along at least part of the elongated body, with the requirement that the engagement edge is in yielding cooperation with and applies pressure on the threadline at an engagement position when the second member is completely inserted in the first member, so that
  - the second member may be inserted completely in the first member without the second member turning when an adequate direct insertion force is applied on the second member through the aperture, and
  - when the second head is turned by the driving tool in a preselected direction, after the second member has been completely inserted in the first member, the second head is forced to be at least partially advanced away from the first head, the diameter of the threadline becoming smaller at the engagement position as compared to the diameter of the threadline in front of it toward the leading point.

21. A fastening member as defined in claim 20, wherein the diameter of the threadline becomes smaller in a gradual fashion.

22. An assembly of a first object and a second object secured to each other by a fastening device as defined in claim 20.

23. An assembly as defined in claim 22, wherein the first fastening member extends through both objects.

24. An assembly as defined in claim 22, wherein the first fastening member is an integral part of the first object and extends through the second object.

25. An assembly as defined in claim 22, wherein one of the first and the second objects is substantially an automobile and the other object is an automobile part.

* * * * *